Patented Apr. 16, 1935

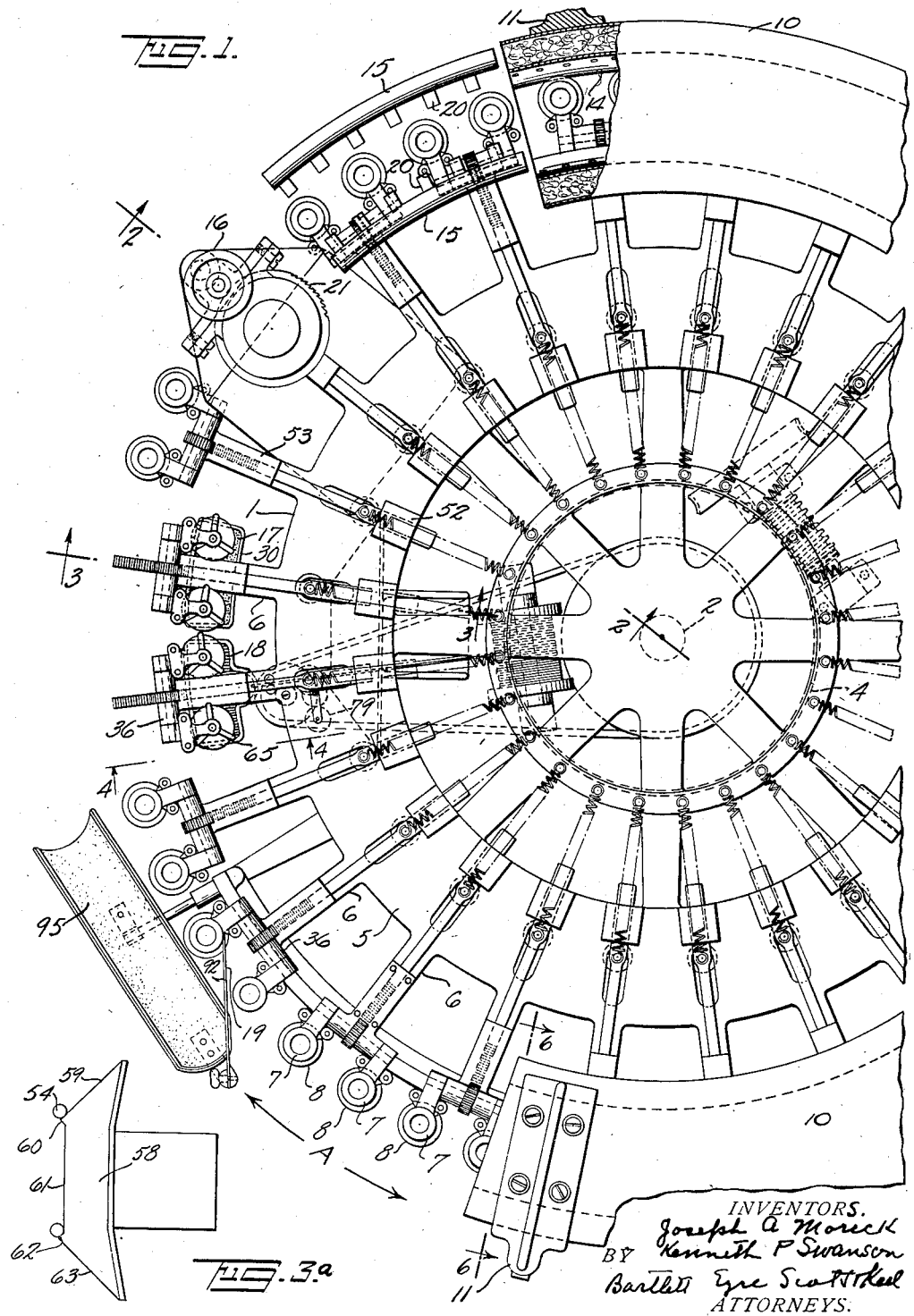

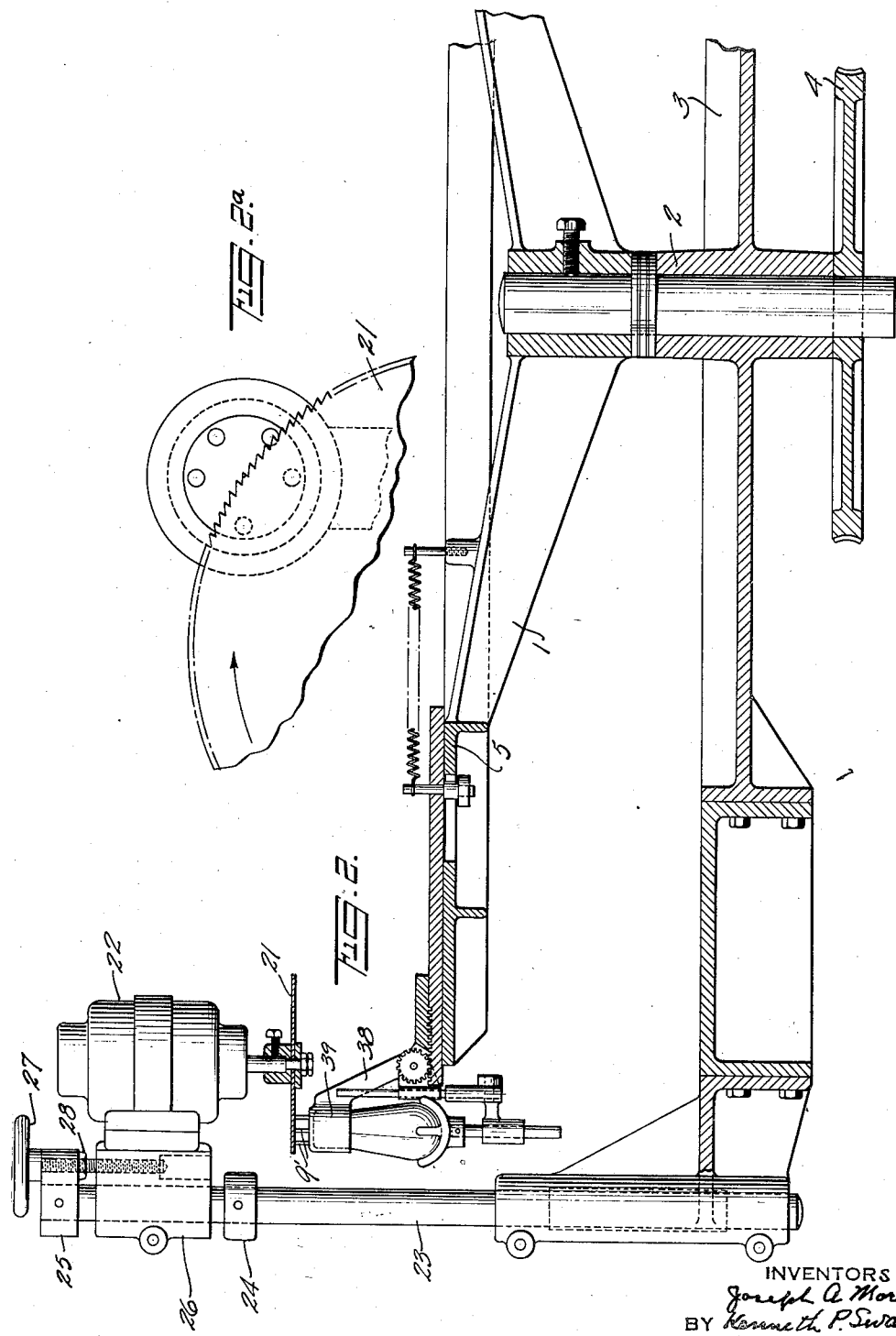

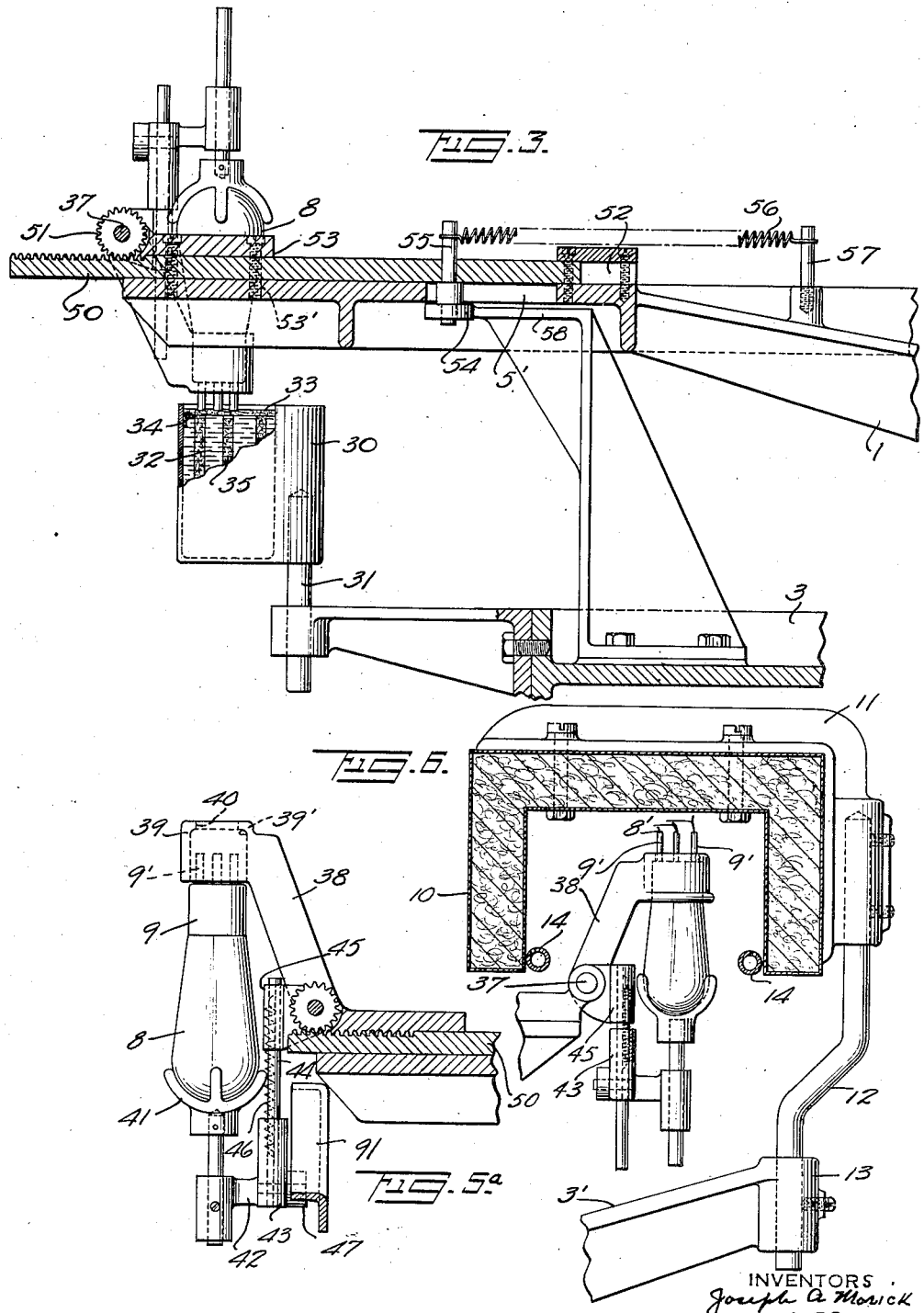

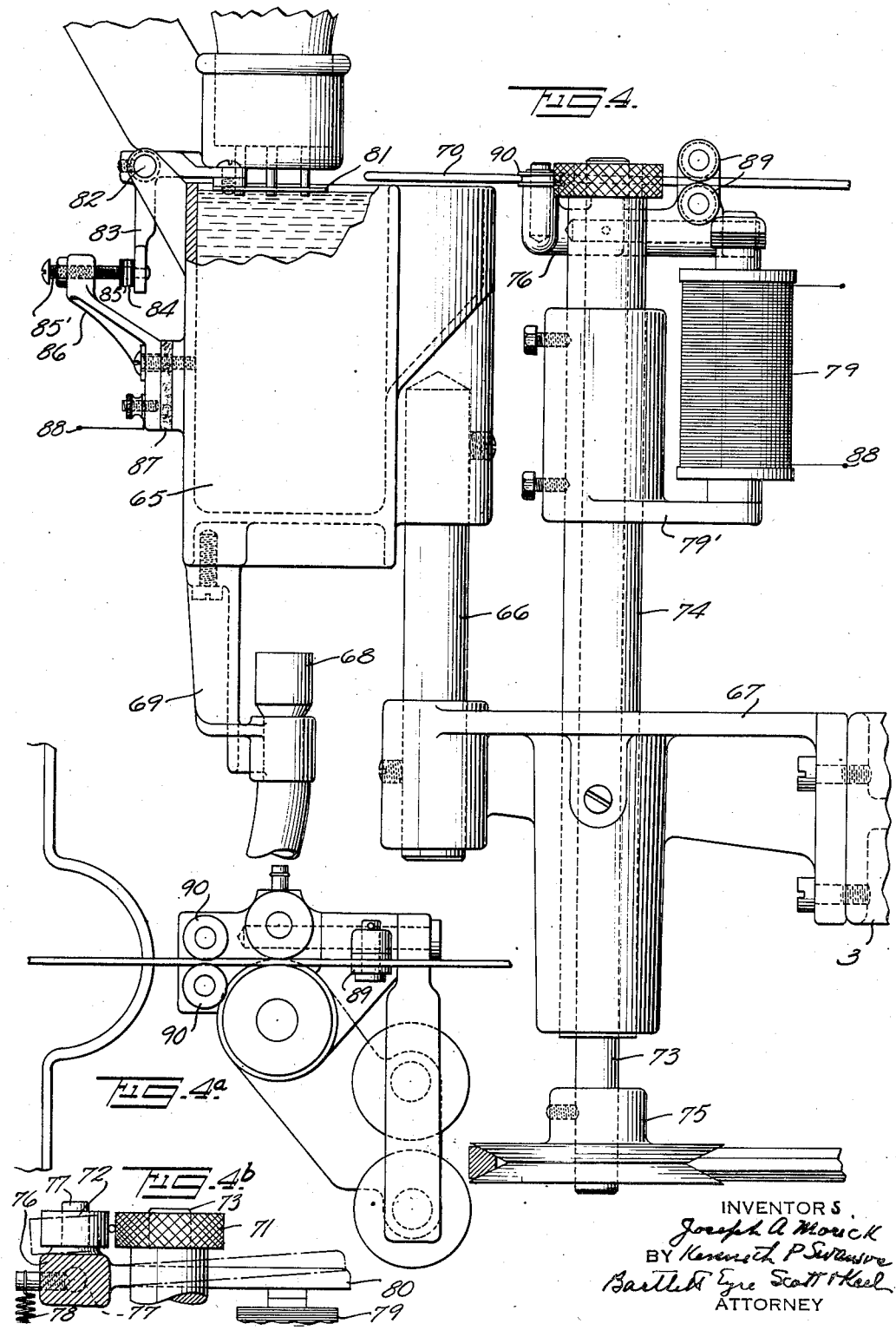

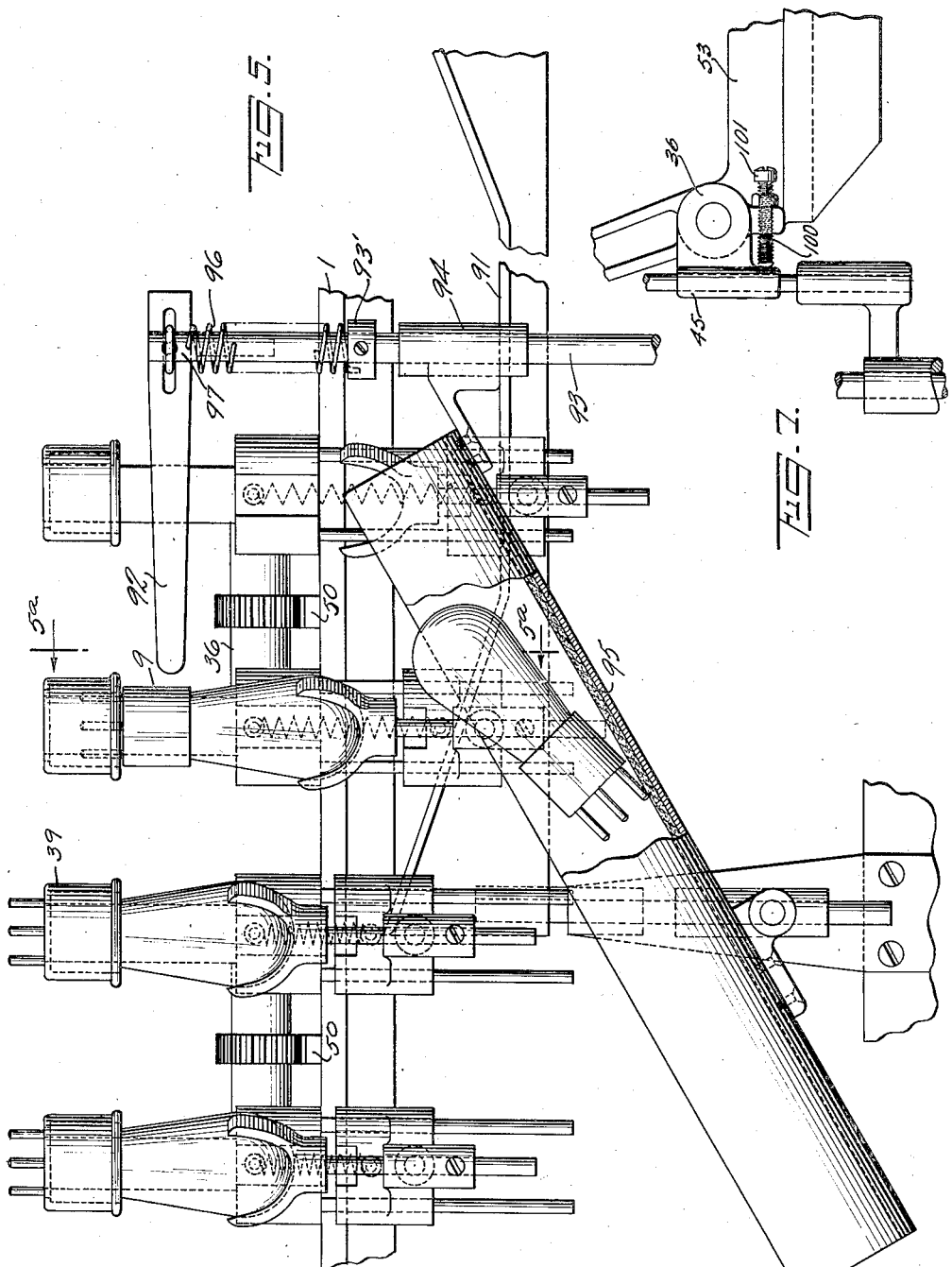

1,997,694

UNITED STATES PATENT OFFICE 1,997,694

BASING MACHINE

Joseph A. Morick, Kenilworth, and Kenneth P. Swanson, Irvington, N. J., assignors to Eisler Electric Corporation, Newark, N. J., a corporation of Delaware Application May 12, 1930, Serial No. 451,832
Renewed July 3, 1934

15 Claims. (Cl. 250—27.5)

This invention relates to machines for basing electric bulbs, particularly radio tubes, and for soldering the leading in wires to the base terminals.

The object of the invention is a novel and improved machine for basing radio tubes and particularly a machine which is characterized by its simplicity in construction and reliability in operation. A further object of the invention is a machine of this character including a novel and improved combined baking and cooling means for the assembled bulbs and bases. A further object of the invention is a machine of this character including novel means for trimming and cutting the surplus ends of the leading-in wires projecting through the base plugs. A further object of the invention is a machine of this character including novel means for fluxing and soldering the leading-in wires terminals or prongs to the base plugs. A further object of the invention is a machine of this character including novel means for automatically replenishing or supplying solder to the soldering means. A further object of the invention is a machine of this character including novel means for dumping the finished bulbs from the machine. A further object of the invention is a novel machine for automatically performing the successive operations of baking the tubes, cooling them, trimming the surplus leading-in wires, fluxing and soldering the leading-in wires to the base plugs and automatically dumping the finished bulbs from the machine. A further object of the invention is a machine of this general character characterized by the economy in manufacture and assembly thereof.

For a better understanding of the above indicated novel features of the invention and others which will hereinafter appear reference may be had to the accompanying drawings forming a part of this application wherein:

Fig. 1 is a plan view of the machine with certain parts broken away and certain parts omitted, Fig. 2 is a sectional view along the line 2—2 of Fig. 1, Fig. 2a is a plan view of a part of the trimming means, Fig. 3 is a section along the line 3—3 of Fig. 1, Fig. 3a is a plan view of the cam for actuating the fluxing and soldering means, Fig. 4 is a view along the line 4—4 of Fig. 1, Fig. 4a is a plan view of a part of the mechanism of Fig. 4, Fig. 4b is a detail of a part of the automatic soldering supply mechanism, Fig. 5 is a side view of the dumping means, Fig. 5a is a section along the line 5a—5a of Fig. 5, Fig. 6 is a section along the line 6—6 of Fig. 1, and Fig. 7 is a view of means limiting movement of heads.

Referring to the drawings the invention is embodied in a machine including a rotatable spider 1 having a shaft journaled in a bearing 2 carried by a frame support 3, the spider being driven in any suitable manner, as for example by an electric motor (not shown), one of the driving gears 4 being keyed to the shaft of the spider 1. The spider frame merges into an annular table-like structure 5 and from the table 5, radial arms 6 extend outwardly carrying heads designated generally by the numeral 7 for supporting the assembled bulbs and bases 8 therein. The bulbs 8 with the bases 9 are assembled on the carrying heads 7 while the latter are passing through the range indicated by the angle A and the rotating spider carries these bulbs thus assembled through an annular baking oven indicated at 10, this oven being in the form of an inverted U-section having fittings 11 attached thereto for attachment to supporting posts 12 adjustably carried by a frame member 3' at 13. The baking oven is provided with the heating means indicated at 14, this being in the form, as for example, of gas supply and heating flame pipes disposed near the ends of the legs of the U-shaped section. The baking oven in the particular embodiment shown extends more than halfway around the machine, although, of course, the annular extent of the oven may be varied to suit the particular requirements. The bulbs 8 and bases 9 being assembled in the head supports 7 are progressively carried through the baking oven 10 in a counter clock direction (in plan view). After passing through the oven the bases are automatically cooled, trimmed, fluxed, soldered and removed from the head supports 7, the cooling means being indicated at 15, the trimming means at 16, the fluxing means at 17, the soldering means at 18 and the kick-off means at 19.

The cooling means includes a plurality of air nozzles 20 causing a multiplicity of air jets to play upon the bases 9 of the bulbs as the bulbs are carried therepast, the air jet nozzles 20 being supplied by a common air pressure supply pipe.

The trimming mechanism 16 includes a circular saw 21 driven by an electric motor 22 and operating in a plane parallel to the plane of movement of the bulb bases, the circular trimming saw 21 being supported on a level with the ends of the terminals or prongs 9' forming a part of and projecting from the bases 9, these terminals 9' being hollow or tubular and having projecting therethrough the leading-in wires 8' which are to be soldered to the terminals 9'. The trimming or cutting saw 21 trims off the surplus or projecting portions of the leading-in wires 8' as the bulbs are carried beneath the saw. The motor 22 is supported from the framework 3 by means of a standard 23, the standard 23 carrying fixed collars 24, 25 near the upper end thereof between which the motor base 26 is adjustably mounted upon the standard 23. The base 26 is slidably mounted upon the standard 23 and the motor together with the trimming saw 21 may be adjusted to the exact level desired by means of the adjusting screw 27 which is journaled in the collar or bracket 25 and cooperates with a screw-threaded opening in the base 26 to lower or elevate the driven motor and its base. A locking nut 28 is indicated for locking the mechanism in a fixed position. The electrical circuit for driving and controlling the motor 22 is omitted for convenience.

The fluxing mechanism includes a fluxing tank 30 which is supported in any suitable manner from the frame 3, as for example upon a rod or standard 31. The fluxing tank contains a body of fluxing liquid 32 therein with a felt pad 33 supported near the top of the tank in any suitable manner, as for example upon the supports indicated diagrammatically at 34, and this pad is maintained moist with the fluxing liquid at all times by means of suitable wicks 35. The ends of the plugs 9' of the bases are dipped into the fluxing tank 30 in contact with the felt pad 33 by reversing the normal position of the supporting heads 7 as the bulbs are carried past the fluxing tank. For this purpose the heads 7 are pivotally mounted in pairs for this reversal in position. For example, each radial arm 6 of the spider carries at the outer end thereof a tangential bearing 36, in which is journaled a shaft 37 and this shaft 37 carries on each end one of the heads 7, each of such heads including a normally upwardly extending and outwardly inclined arm 38, such arm having a socket 39 for the reception of the base of the bulb the arrangement being such that the plugs 9' project up through the socket through an opening 40 in the socket when the base engages an inner shoulder 39' surrounding the opening 40. The heads 7 also include a spring pressed claw or finger support 41 disposed in line with the socket 39 and engaging the bulb 8 to yieldingly hold it and the base 9 in engagement with the socket. The finger support 41 is carried by a bracket 42 which includes a female guiding member 43 slidably mounted on a male guide member 44, the latter being fixed to a bracket 45 which is rigid with the arm 38. The bracket 42 is yieldingly held in its uppermost position, with the member 43 in engagement with the member 45, by means of a tension spring 46, and when a lamp bulb and base are assembled on the head support the spring 46 yieldingly holds the base 9 in the socket 39 and against the shoulder 39'. The member 42 is provided with a cam roller engaging means 47 for a purpose hereinafter set forth. The pairs of heads 7 thus mounted upon the rotating pintles or shafts 37 are normally maintained in a position with the base 9 projecting upwardly by means of a rack 50 meshing with a pinion 51 carried intermediate the ends of the shaft or pintle 37 and disposed in a slot dividing the bearing member 36 into a pair of alined journals. The rack 50 is guided in alined radially disposed guides 52 and 53, the guides 52 being mounted upon and attached to the inner edge of the annular table 5 and the guides 53 being mounted upon and attached to the radially extending spider arm 6. The bearing members 36 form a part of the members 53. Each rack 50 is provided with a roller 54 carried by a pin 55 fixed to the rack 50 and projecting through a slot 5' formed in the table 5, the pin 55 projecting also above the rack 50 and being attached by means of a tension spring 56 to a relatively fixed part of the spider 1 by means of a pin 57, this spring 56 normally retracting the rack 50 to its innermost position with the device forming a stop limiting the inward movement. This position corresponds to the normal baking, cooling and trimming operations. Adjacent the fluxing tank 30 is disposed a cam member 58 having an incline 59 with which the roller 54 engages as a pair of heads 7 approaches the fluxing tank, automatically actuating the rack 50 in an outward direction to rotate the heads approximately 180° to dip the ends of the plugs or prongs 9' into the tank 30. The height 60 of the cam or incline 59 is reached just as the pair of heads 7 are immediately above the fluxing tank 30. At this point the terminals 9' are caused to be dipped into the fluxing tank 30 as indicated in Fig. 3 ready for the soldering operation to follow. Immediately after passing the point 60 the roller 54 drops to the surface 61 of the cam 58 which causes the rotation of the heads sufficiently to elevate the terminals 9 above the rim of the tank 30 permitting the unhindered continued rotation of the spider. In the particular embodiment herein shown the cams for causing the fluxing, soldering and dipping operations are combined into one member 58, the surface 61 thereof permitting the base and its plugs 9' to freely pass over the edges or rim of the soldering tank 65. At the end of the surface 61 is provided a cam point 62 similar to the cam point 60 for dipping the ends of terminals 9' into the solder bath for closing up the ends of the terminals and firmly soldering the leading-in wires 8'. After passing the cam point 62 the roller 54 runs down the incline 63 of the cam 58 to again permit the spring 56 to set the pair of heads 7 in an upright position.

The soldering tank 65 is supported in any suitable manner, as for example upon a standard 66 mounted upon a bracket 67 carried by the framework 3, the tank and the standard 66 being adjustable to obtain the exact position required. Suitable means are provided for heating the tank 65 and maintaining the solder bath hot, such for example as the gas burner 68 carried by a bracket 69 supported from the bottom of the tank 65.

The solder bath is automatically replenished and the level thereof automatically maintained. This is done by automatically feeding a solder strip 70 to a position above the tank as the need for additional solder arises, the heat from the solder bath melting the end of the strip 70 as it projects over the tank. The strip 70 is automatically fed by a rotating knurled disc 71 cooperating with a roller 72 and being carried on the upper end of a shaft 73, the latter being journaled in a sleeve 74 carried by the bracket 67 and projecting thereabove. A pulley drive 75 is indicated for the shaft 73. The arresting of the feeding movement is effected by movement of the friction roller 72. This is carried by a bracket 76 pivoted on an axis 77 and normally urged by a spring 78 to the dotted position indicated in Fig. 4b out of driving engagement with the knurled roller 71. The pivoting of the bracket 76 against the tension of spring 78 is effected by an electro-magnet 79 operatively associated with an armature carried by the lever arm 80 which is fastened to or forms a part of the pivoted bracket 76. The circuit of the electro-magnet 79 is automatically controlled by means of a float 81 resting upon the solder bath, this float 81 being carried by the end of a bell crank lever pivoted at 82 the other arm 83 of this lever carrying a movable contact 84 which cooperates with an adjustable contact 85 carried by a bracket 86 which is fastened to the tank 65 and insulated therefrom as indicated at 87. The stationary contact 85 is adjustable by means of the set screw 85' to the required position corresponding to the level of the solder bath desired. The contacts 84 and 85 are disposed in the circuit 88 of the electromagnet 79. Accordingly when the solder bath recedes to a predetermined level this circuit is closed and the electromagnet 79 actuates the roller 72 to a position to grip the solder wire 70 between it and the rotating knurled disc 71. When the solder bath reaches the predetermined level the circuit is automatically broken. The pivoted bracket 76 carries a pair of guide rollers 89 for guiding the strip 70 in advance of the disc 71 and also carries similar guide pulleys 90 to the rear thereof disposed in a plane at right angles to that of the rollers 89, the pivoting movement of the bracket 76 moving the wire 70 laterally towards and away from the disc 71. The electro-magnet 79 is adjustably carried by means of the bracket 79' secured to the upwardly extending bearing sleeve 74.

After the soldering operation and the heads are reversed to the normal upright position the heads are carried to the unloading and loading positions. Upon approaching the unloading position the cam roller 47 of a supporting head engages the cam surface of a cam 91 which is carried by the framework and this automatically depresses the finger support 41 thereby lowering the bulb 8, 9 sufficiently to permit the removal thereof therefrom, the bulb resting by gravity upon the supporting fingers 41. A torsion finger 92 is supported on a rod 93 carried by a bracket 94 fixed to the chute, this finger 92 projecting in the path of the released bulbs 8, 9 and functioning to automatically kick the bulb laterally from the finger support 41 into a chute 95. The torsion finger or arm 92 is yieldingly held in position by means of a torsion spring 96 providing for the yielding engagement of the arm with the bulb. For this purpose the arm 92 is carried by a pin 97 swivelled into the rod 93, the spring 96 having one end attached to the pin 97 and the other end attached to a collar 93' fixed to the rod 93. After passing the automatic dumping position the heads pass on through the loading position where the operator assembles the bases and bulbs on the supporting head 7, it being understood that a suitable basing cement is contained within the bases to mechanically seal the bases to the bulbs as they are passed through the baking oven. After the loading of the bulbs on the supports the cam rollers 47 slide out from under the cam 91 permitting the yieldingly held finger grip 41 to carry the bulb and base 9 upwardly with the base 9 firmly but yieldingly engaging the socket as above described.

Means for limiting the inward radial movements of the racks 50 under the influence of the springs 56 are indicated at 100, this means including an adjustable set screw and lock nut carried on an ear on the under side of bearing 36 and adjustably engaging the end of the head casting 45.

We claim:

1. In a basing machine for radio tubes a turntable, a plurality of supporting heads for assembled bulbs and bases, a baking oven through which the heads pass, relatively stationary means disposed in the path of and operative to trim and remove the surplus ends of leading-in wires projecting from the bases as the latter advance from one position to another, means for thereafter soldering the leading-in wires to the bases, and means for rotating the turntable, a soldering bath being provided and the supporting heads being movable independently of the rotation of the table to dip the bases in the bath and effect the soldering of the leading-in wires to the bases.

2. In a basing machine for radio tubes a turntable, a plurality of supporting heads for assembled bulbs and bases carried by said turntable, a baking oven through which the heads pass, means for trimming and removing the surplus ends of leading-in wires projecting from the bases, means for thereafter soldering the leading-in wires to the bases, and means for rotating the turntable, the supporting heads normally supporting the tubes with the bases uppermost, but being pivotally mounted for reversing the position thereof together with means for reversing the supporting heads and dipping the bases in a soldering bath.

3. In a basing machine for radio tubes a turntable, a plurality of supporting heads for assembled bulbs and bases carried by said turntable, a baking oven through which the heads pass, means for trimming and removing the surplus ends of leading-in wires projecting from the bases, means for thereafter soldering the leading-in wires to the bases, and means for rotating the turntable, the supporting heads normally supporting the tubes with the bases uppermost but being pivotally mounted for reversing the position thereof together with means for reversing the supporting heads and dipping the bases in a soldering bath, and a trimming mechanism including a circular saw disposed in a plane to remove the surplus ends of the leading-in wires projecting from the base in advance of the reversing and soldering position.

4. In a basing machine a carrier, a multiplicity of tube supporting heads on said carrier, a baking oven through which said supporting heads pass and means for soldering the leading-in wires to the base plugs after passing through the baking oven, the tube supporting heads normally occupying one position while going through the baking oven, but being moved to another position after passing therethrough to dip the bases and solder the leading-in wires to the bases together with means for moving said heads to the soldering position as they pass the soldering means.

5. In a basing machine a carrier, a multiplicity of tube supporting heads on said carrier, a baking oven through which said supporting heads pass and means for soldering the leading-in wires to the base plugs after passing through the baking oven, the tube supporting heads normally supporting and carrying the tubes with the bases uppermost but being pivotally mounted to reverse the tubes to dip the ends of the bases in a soldering bath.

6. In a basing machine a carrier, a multiplicity of tube supporting heads on said carrier, a baking oven through which said supporting heads pass and means for soldering the leading-in wires to the base plugs after passing through the baking oven, the tube supporting heads normally supporting and carrying the tubes with the bases uppermost but being pivotally mounted to reverse the tubes to dip the ends of the bases in fluxing and soldering baths.

7. In a basing machine a carrier, a multiplicity of tube supporting heads on said carrier, a baking oven through which said supporting heads pass and means for dipping and soldering the leading-in wires to the base plugs after passing through the baking oven, the supporting heads being movably supported on the carrier and means being provided for automatically shifting the supporting heads from the baking to the dipping and soldering position at the soldering point.

8. In a basing machine a carrier, a multiplicity of tube supporting heads on said carrier, a baking oven through which said supporting heads pass and means for dipping and soldering the leading-in wires to the base plugs after passing through the baking oven, the supporting heads being movably supported on the carrier and means being provided for automatically shifting the supporting heads from the baking to the dipping and soldering position at the soldering point, said shifting means including a rack and pinion drive mechanism for the supporting heads and a cam for actuating the rack and pinion mechanism against the tension of a spring.

9. In a basing machine a carrier, a multiplicity of bulb supporting heads on said carrier, said heads being pivotally mounted thereon for actuation to either a baking position or to a treating position, a baking oven through which the supporting heads pass, a treating bath and means for shifting the supporting heads from the baking position to the treating position and causing the bulbs to dip into the treating bath when passing the same.

10. A machine of the character set forth in claim 9 wherein the shifting means includes a stationary cam, and rack and pinion mechanisms for the heads operable by said cam for shifting the heads from the baking position to the treating position.

11. In a basing machine a carrier, a multiplicity of tube supporting heads on said carrier, a baking oven through which said supporting heads pass and means for soldering the leading-in wires to the base plugs after passing through the baking oven, means being provided for fluxing the base plugs in advance of the soldering means, said fluxing means including a tank with a fluxing bath and a mechanism for moving the supporting heads to cause them to dip into and out of the fluxing and soldering baths in succession.

12. In a basing machine a carrier, a multiplicity of tube supporting heads on said carrier, a baking oven through which said supporting heads pass and means for soldering the leading-in wires to the base plugs after passing through the baking oven, means being provided for fluxing the base plugs in advance of the soldering means, said fluxing means including a tank with a fluxing bath and a mechanism for moving the supporting heads to cause them to dip into and out of the fluxing and soldering baths in succession, the fluxing bath including a tank with a moistening pad supported therein and fed by wicks projecting down into the fluxing bath.

13. In a basing machine for radio tubes, a turntable with heads thereon for advancing the tubes in succession, a soldering bath beneath the path of the heads, and means for moving said heads as they pass over the soldering bath to cause the tubes to dip into the bath.

14. In a machine of the character set forth in claim 13 wherein the tubes are caused to be reversed in position after dipping into the bath.

15. In a machine of the character set forth in claim 13 wherein a fluxing bath is disposed in advance of the soldering bath and the tubes are caused to dip first into and out of the fluxing bath and then into and out of the soldering bath.

JOSEPH A. MORICK.
KENNETH P. SWANSON.